No. 790,076. PATENTED MAY 16, 1905.
M. M. QUINN.
SHEARING DEVICE FOR GLASS FORMING MACHINES.
APPLICATION FILED FEB. 23, 1904.
3 SHEETS—SHEET 1.
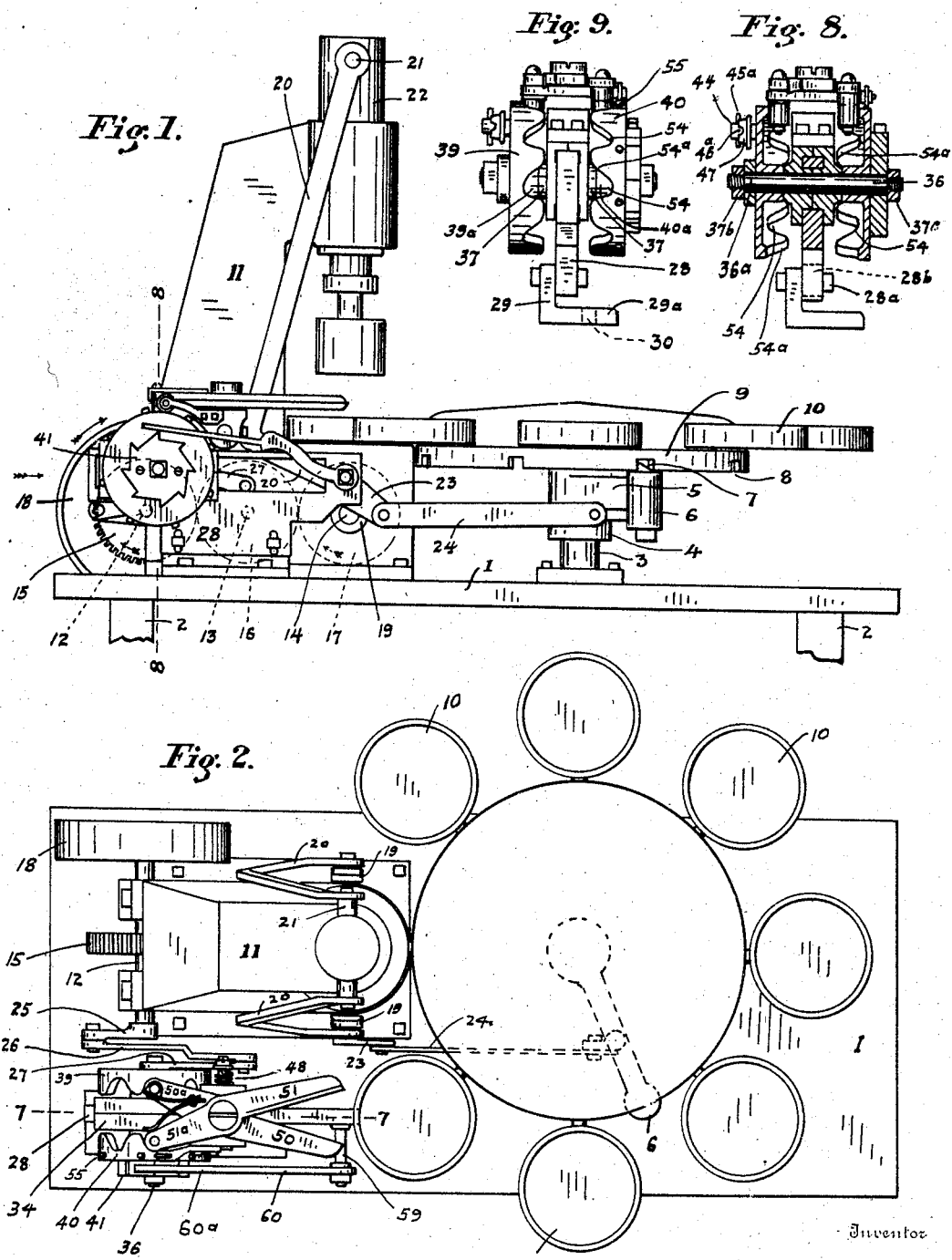

No. 790,076. PATENTED MAY 16, 1905.
M. M. QUINN.
SHEARING DEVICE FOR GLASS FORMING MACHINES.
APPLICATION FILED FEB. 23, 1904.
3 SHEETS—SHEET 2.
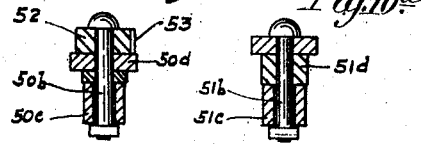
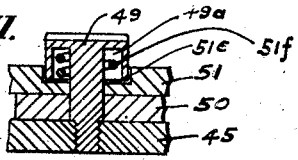
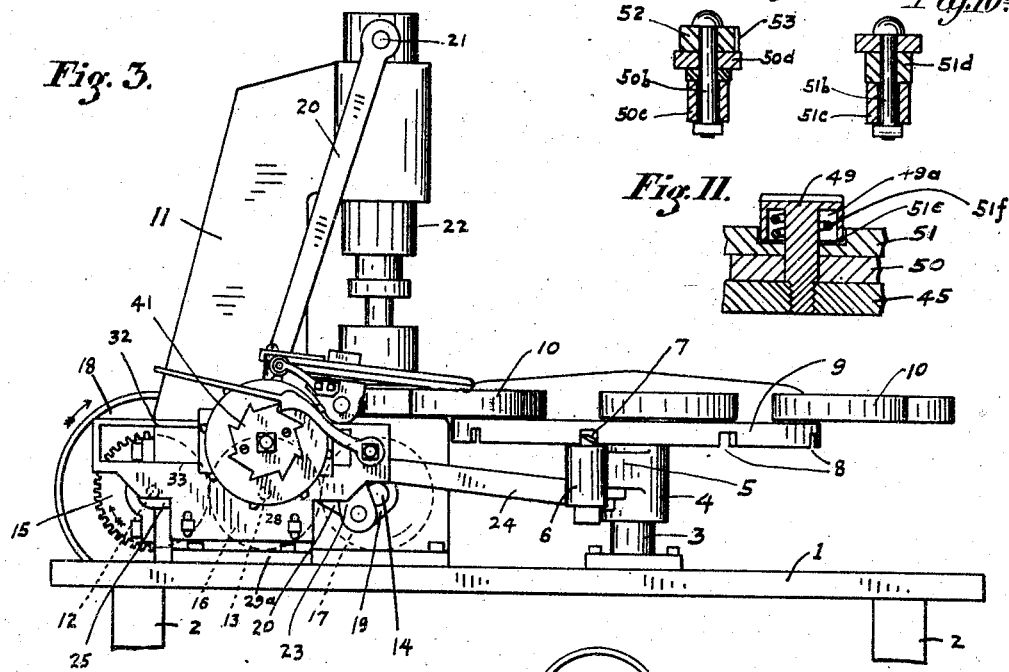
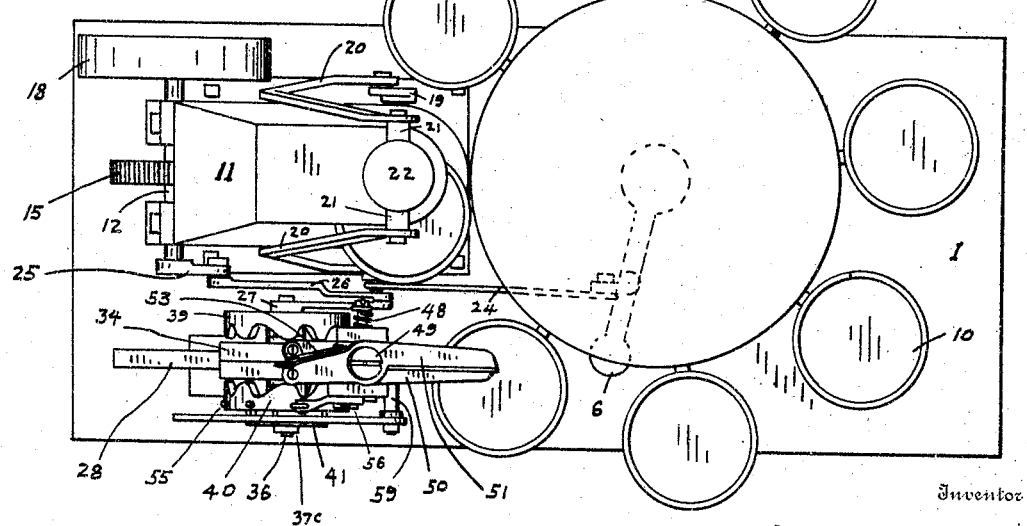
Inventor
Marshall M. Quinn
Witness
Thomas L. Ryan
J. Monroe Fitch No. 790,076. PATENTED MAY 16, 1905.
M. M. QUINN.
SHEARING DEVICE FOR GLASS FORMING MACHINES.
APPLICATION FILED FEB. 23, 1904.
3 SHEETS—SHEET 3.
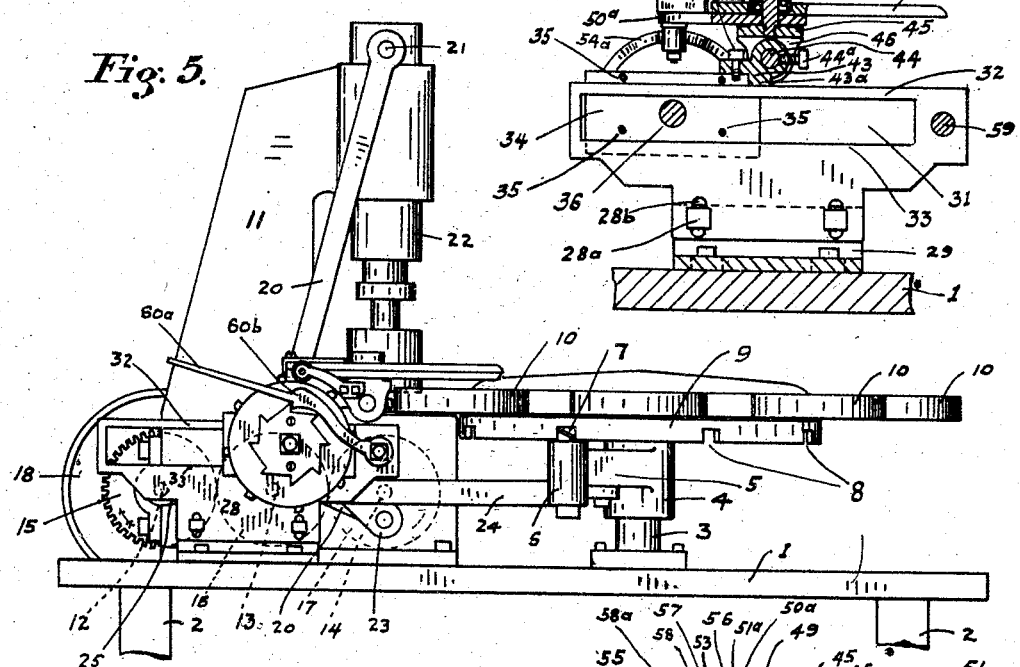

No. 790,076. Patented May 16, 1905.

UNITED STATES PATENT OFFICE.

MARSHALL M. QUINN, OF MUNCIE, INDIANA, ASSIGNOR OF ONE-THIRD TO GARRETT O. DRISCOLL AND ONE-THIRD TO WARD H. CRABILL, OF MUNCIE, INDIANA.

SHEARING DEVICE FOR GLASS-FORMING MACHINES.

SPECIFICATION forming part of Letters Patent No. 790,076, dated May 16, 1905.

Application filed February 23, 1904. Serial No. 194,982.

*To all whom it may concern:*

Be it known that I, MARSHALL M. QUINN, of Muncie, in the county of Delaware and State of Indiana, have invented a certain new and useful Shearing Device for Glass-Forming Machines; and I do hereby declare the following to be a full, clear, and exact description of the invention, reference being had to the accompanying drawings, which form a part of this specification.

This invention relates to improvements in machines for forming glassware in which the shearing device operates in conjunction with a mold, a movable mold-carrier, and a plunger for pressing the glass after the same has been deposited in the mold.

In practice it has been found that upon severing the glass with the cut-off mechanisms now in use preparatory to its being placed in the mold the glass so severed frequently adheres to the edges of the cutting mechanism, thus permitting the glass to become chilled and unfit for practical use in the mold, also preventing the punctual deposit of glass in the mold and necessitating the tap of a hammer or other implement to remove the glass from the cut-off mechanism, thus causing the quantity of glass so severed to be faulty and causing such delay in the deposit of the same in the mold that the proper consistency of the same is lost and the article subsequently pressed is imperfect, and also causing a loss of time and material in the operation and manipulation of the machine. It has also been found in practice that in the cut-off mechanisms now in use in machines for forming glassware when continuously and rapidly operated the cutting edges of the same become heated to a high degree of temperature, and it is impossible to keep the same cool on the cutting edges without injury to the glass severed and by reason of which heating the blades of the same are rapidly worn out and repairs necessitated.

The objects of my improvement are to provide a shearing device for separating a quantity of glass from the supply thereof of simple construction and of few parts and which can be connected to and actuated by the forming-machine and to afford facilities for punting from the shears the quantity of glass so severed.

A further object of my improvement is to afford facilities for withdrawing the shearing mechanism after each operation of shearing and punting the glass has been accomplished from its position of said operation to its normal position, whereby suitable means for cooling the shears may be applied to the same while the shearing mechanism is in such normal position, and whereby the mold and the view of the mold is unobstructed, by which the operative is enabled to gage with certainty the charge or supply of glass to be presented to the shears.

These and other objects not hereinbefore mentioned are accomplished by the construction illustrated by the accompanying drawings, wherein similar numbers of reference refer to similar parts throughout the several views, in which—

Figure 1 is a side elevation of a glass-forming machine with my shearing device attached thereto, showing the plunger in its uppermost position, the molds in their normal position, and the shearing mechanism of the device in its inward normal position. Fig. 2 is a top plan view of Fig. 1. Fig. 3 is a side elevation of the machine, showing the plunger lowered toward its lowermost position, the shearing mechanism advanced toward its outermost position, the molds advanced, the mold in which the article is to be pressed nearing its position under the plunger for the operation of pressing. Fig. 4 is a top plan view of Fig. 3. Fig. 5 is a side elevation of the machine, showing the plunger in its lowermost position, the molds in their normal position, the mold in which the article is to be pressed being underneath the plunger, the shearing mechanism in its outermost position. Fig. 6 is a top plan view of Fig. 4 with part of the molds and part of the mold-carrier removed. Fig. 7 is a longitudinal section of the shearing device on the line 7 7, Fig. 2, showing the standard 28 in elevation. Fig. 8 is a detached enlarged vertical cross-section of the shearing device on the line 8 8, Fig. 1. Fig. 9 is a detached enlarged end view of the shearing device looking in the direction shown by the arrow in Fig. 1. Fig. 10 and Fig. 10^A show detached enlarged vertical cross-section views of the shear-blade legs as shown in Fig. 8. Fig. 11 is a detached enlarged section of a portion of the shears as shown in Fig. 7. Fig. 12 is a detached enlarged side elevation of the shearing device as shown in Fig. 1.

In the drawings I have shown only so much of the glass-forming machine as is necessary to be shown for the purposes of illustrating my present invention. While I have shown the shearing device applied to this particularly-shown machine, I do not desire to limit myself to the use of the same with this machine, as it is obvious that my device could be used with various kinds of machines other than that shown without in the least changing the operation of the shearing device.

In the drawings, 1 designates a suitable base supported by the legs 2. Extending upwardly from and supported by the base is the standard 3, upon which is supported the rotatable sleeve 4 with the arm 5, having the cylindrical support and guide 6, sustaining the ratchet 7, which engages in the notches 8 of the rotatable table 9, which carries the molds 10. Also extending upwardly from and supported by the base is the standard 11, in which are journaled the shafts 12, 13, and 14, upon which shafts are supported the gear-wheels 15, 16, and 17, all shown in dotted lines in Figs. 1, 3, and 5. Secured to one end of the shaft 12 is the driving-pulley 18. Secured to both ends of the shaft 14 are the cranks 19. Pivotally connected both at their lower ends to the cranks 19 are the two pitmen 20, their upper ends being connected by means of the shaft 21 to the plunger 22. Secured to the shaft 14 by means of the crank 19 is the crank 23. Pivotally connected to the crank 23 and the arm 5 of the mold-carrier is the pitman 24. Secured to the end of the shaft 12 and opposite the pulley 18 is the crank 25, to which is pivotally attached the pitman 26 and the connecting-rod 27, by means of which the motion necessary to operate the shears is imparted in the operation of the machine to the shearing mechanism.

The machine as far as described forms no part of this invention, but is thus so partly illustrated and described to show the connection between some kind of a forming-machine and my shearing device and how my shearing device may be operated by the movement of the forming-machine.

The standard 28, supported on the base 29, with flange 29$^a$, and connected thereto adjustably vertically by means of the bolts 28$^a$ passing through the wide vertical slots 28$^b$, constitute the frame of my shearing device. By means of the adjustable connection shown the standard 28, supporting the shearing mechanism, may be accurately and rigidly sustained in a tilted position, making possible the operation of the shearing mechanism upon an inclining or a declining plane, it being frequently desirable in practice to operate the shears in either an upwardly or downwardly slanting position in reference to the mold or in reference to the means for conveying the severed glass to the mold, and so that the severed quantity of glass to be pressed may be punted precisely toward a given point.

Provided in the flange 29$^a$ are the longitudinal slots 30, through which bolts suitable for fastening the support rigidly in position may be passed and by means of which the position of the shearing device with reference to the glass-forming machine may be adjusted.

31 designates the longitudinal slot in the standard, in which slot is slidingly secured the cross-head 34, with its upper and lower edges bearing against the guides 32 and 33, respectively. As plainly shown in Fig. 7 and Fig. 8, the cross-head is made of two pieces, each half having the inwardly-extending upper and lower longitudinal slots therein, so adapted that when the halves of the cross-head are secured each to the other by means of the countersunk bolts 35, their faces together, the guides 32 and 33 are clasped slidingly. By this construction a compact and rigid carrying means for the shearing mechanism is formed which is easily assembled and adapted to be easily placed and maintained in accurate position.

Rigidly secured by suitable means to the cross-head 34 at its center is the transversely-extending shaft 36, the ends of which project for the purposes hereinafter described. On the sides of the cross-head and surrounding the shaft 36 are formed the annular shoulders 37, adapted to act as bearing-surfaces for the corresponding similar shoulders 39$^a$ and 40$^a$ of the actuating-wheels 39 and 40.

Pivotally positioned on the outer end of the shaft 36 and rigidly secured to the outer face of the actuating-wheel 40 by means of the countersunk bolts 41$^a$ is the ratchet-wheel 41, the function of which will be hereinafter shown. The inner end of the shaft 36 is provided with the portion 36$^a$, adapted to form means for the bearing for a crank or other form of actuating means from the glass-forming machine by which the shearing device is operated.

37$^b$ and 37$^c$ designate the nuts by means of which the cross-head, actuating-wheels, and ratchet are retained in their proper positions upon the shaft 36. Rigidly secured to the front end of the cross-head by means of the bolts 42 is the lug 43, provided with the downwardly-extending lip 43$^a$, which fits closely against the forward end of the cross-head and is adapted to transmit jointly to the cross-head and the guide 32 the strain caused when the operation of the shearing and punting of the glass is performed. Journaled in the lug 43 is the transversely-extending shaft 44, upon which is pivotally mounted the platform 45, having the downwardly-extending walls 46. The shaft 44 is movably secured to the lug 43 by means of the set-screw $44^a$ and is provided at its inwardly-extending end with the rigidly-secured pin $45^a$, adapted to fit within the semicircular recesses of the adjusting-ring 47, revolubly positioned upon the shaft 44, all as plainly shown in Figs. 2, 4, 6, 8, and 9. Secured to the adjusting-ring 47 is the outer end of a strong coiled spring 48, which spring surrounds the shaft 44, and the opposite end of which spring is secured to the platform 45, and which spring yieldably maintains the platform upon which rests the shears in its normal horizontal position. When it is desired to loosen or tighten the spring, the ring 47 is revolved by the operative accordingly, the transverse pressure of the spring forcing the recesses $46^a$ against the pin 45, thereby locking the same. By this means the degree of rapidity of the jerk or twitch desired to be imparted to the shears when after the shearing operation the glass which has been severed is to be punted from the shears may be regulated to a nicety.

Positioned horizontally and pivotally connected by means of the bolt 49 to the platform 45 are the shear-blades 50 and 51, having the legs $50^a$ and $51^a$, respectively, the outer ends of which legs are provided with the downwardly-extending bolts $50^b$ and $51^b$, shouldered at their bottoms and provided with nuts which support loosely the sleeves $50^c$ and $51^c$, as shown in Fig. 10, between which sleeves and the legs and surrounding the bolts each are the washers $50^d$ and $51^d$, the purpose of which washers is to maintain the sleeves in uniform position. Pivotally secured to the upper end of bolt $50^b$ is the collar 52, to which is secured by suitable means one end of the leaf-spring 53, the opposite end of which spring bears against the leg $51^a$ of the shear-blade 51, by means of which spring the shear-blades are yieldably maintained in their open and normal position with the cutting edges of the blades apart and with the sleeves $50^c$ and $51^c$ at rest within the lateral openings in the peripheries of the actuating-wheels 39 and 40 and against the innermost surfaces of said openings. The actuating-wheels 39 and 40, as plainly shown in Fig. 8 and Fig. 9, are formed with laterally inwardly projecting peripheries, which are provided with a predetermined number of semicircular openings 54, having a predetermined depth, and from which said semicircular openings the walls $54^a$ slope outwardly toward the inner edges of the peripheries, the line of said walls $54^a$ having such form that when the actuating-wheels in unison are revolved rearwardly the sleeves $50^c$ and $51^c$ bearing against the same will be forced simultaneously inwardly and toward each other, thereby straining the spring 53 and closing the shear-blades, as plainly shown in Fig. 4.

Positioned upon and secured to the outer edge of the periphery of the actuating-wheel 40 and at predetermined positions are the studs 55, so placed that the position of each is certain in reference to each of the semicircular openings 54. The studs 55 are provided each with the sloping faces $55^a$, as shown in Fig. 12, the function of which will be hereinafter described.

Rigidly secured to the platform 45 by means of the bolts 56 is the rearwardly-extending arm 57, provided at its free end, which is positioned immediately above the periphery of the actuating-wheel 40 and in the path of the studs 55, with the revoluble disk 58, mounted upon the pin $58^a$, which disk when the shearing mechanism is in normal position is by means of the spring 48 sustained in contact with the periphery of the actuating-wheel 40.

The shear-blade 51 is provided with the annular recess $51^e$ about the opening for the bolt 49, in the under side of the head of which is the annular opening $49^a$, forming a complementary recess to $51^e$ within the annular opening so formed. With its opposite ends bearing against the recesses in the shear-blade and bolt-head rests the coil-spring $51^f$, which affords yieldable means by which the shear-blades will be always sustained in close contact each to the other, and at the same time the friction due to undue heating in the ordinary mechanisms of this character will be overcome.

Rigidly secured to the frame 28 is the bar 59, upon the outer end $59^a$ of which is pivotally connected the pawl 60, having the outwardly-extending arm $60^a$, as plainly shown in Fig. 12, adapted to rest during the time that the pawl is not in engagement with the ratchet-wheel 41 upon the periphery of the same, thereby sustaining the pawl in position preparatory to its engagement with the ratchet-wheel, as hereinafter described.

$60^b$ designates an enlarged portion of the pawl the purpose of which is to afford additional weight to the same, thus facilitating the engagement at the proper time by the pawl of the ratchet-wheel.

In the operation of the machine the pulley 18 is revolved. By means of the gear-wheels 15, 16, and 17, the cranks 19, and the pitmen 20 the plunger 22 is actuated. As the plunger commences its descent the mold-carrier 9, by means of the crank 23 and pitman 24 and spring-ratchet 7, is actuated and commences to revolve, carrying the molds toward the seat for the repose of same under the plunger during the operation of pressing. Simultaneously with the commencement of the descent of the plunger and the commencement of the movement of the mold-carrier the shearing mechanism, by means of the crank 25, revolved by the shaft 12, and by means of the pitman 26 and connecting-rod 27, commences its travel along the guides 32 and 33 toward the mold-carrier. As the pulley 18 continues to revolve and the parts described continue their respective movements and shortly before the plunger has completed its downward stroke and shortly before the mold in which the article to be pressed has reached its position directly underneath the plunger, all as plainly shown in Fig. 3, and as the shearing mechanism progresses and as the glass to be severed is presented by the operatives to the shears, the pawl 60 engages the ratchet 41, whereby simultaneously with the completion of the downward movement of the plunger and the placing by the mold-carrier of the mold in which the article is to be pressed underneath the plunger, the shearing mechanism has completed its full movement forward, the ratchet together with the actuating-wheels have been revolved rearwardly a predetermined distance, in their movement causing the legs 50$^a$ and 51$^a$ of the shears to be forced inwardly and toward each other and simultaneously causing the edges of the shear-blades to approach and pass each other, performing the operation of shearing. Immediately subsequent to the shearing operation and before the strained spring has been released by the passing of the walls 54$^a$ of the actuating-wheels and the shear-blades separated the stud 55 passes under the revoluble disk 58 of the arm 57, causing a sudden upward jerk of the rear side of the platform upon which rest the shear-blades, by reason of which movement the shear-blades are forced suddenly downwardly and the glass just severed is punted directly from the shears, preventing the same from adhering to the shears and obtaining an accurate discharge of the same. After the passing of the stud the strained spring 46 instantly returns the platform 45, together with the shears resting thereon, to its normal position. The strained spring 53 instantly thereafter and simultaneously with the passing of the abruptly-ending surfaces 54$^a$ of the actuating-wheels by the sleeves 50$^c$ and 51$^c$ forces the legs 50$^a$ and 51$^a$ and the shear-blades to their normal position in readiness for another operation. In the drawings I have shown the shears in their operative position projected to a point above the mold. It is obvious that the same may be positioned so that the operation of shearing may be performed at a point above the mold or within the mold or at a distance from the mold and at such angle upwardly or downwardly as may be desired. As the machine proceeds in its movement the plunger ascends, the shearing mechanism, in its normal position in readiness for another operation, moves rearwardly, while the arm 5 and the spring-ratchet 7 moves forward and simultaneously with the completion of the upward movement of the plunger, the rearward movement of the shearing mechanism, the spring-ratchet 7 engages in the slot 8 of the carrier when the operation of the machine and the shearing device, as just described, is repeated.

What I claim as my invention, and desire to secure by Letters Patent, is—

1. In a glass-forming machine, means for severing the charges of glass, and means for giving said severing means a sudden movement immediately after the operation of the severing means to separate the glass from the severing means.

2. In a glass-forming machine, shears for severing the charges of glass, and means for giving said shears a sudden movement immediately after the operation of the shears to separate the glass from the shears.

3. In a glass-forming machine, the combination with a mold, of shears for severing the charge of glass for the mold, and means for giving the shears a sudden movement immediately after the operation of the shears to separate the charge of glass from the shears.

4. In a glass-forming machine, the combination with a mold, of shears operative above the mold for severing the charge of glass, and means for giving the shears a sudden downward movement immediately after the operation of the shears to separate the charge of glass from the shears and deposit it in the mold.

5. In a glass-forming machine, shears for severing the charge of glass, means for mounting said shears so the same may be tilted, and means for suddenly tilting said shears to give the shearing end a sudden movement immediately after the shears have been operated.

6. In a glass-forming machine, shears for severing the charges of glass, means for mounting said shears so the same may be tilted, and a single means for operating said shears and tilting the same arranged so that the shears will be suddenly tilted immediately after their operation.

7. In a glass-forming machine, shears for severing the charges of glass, means for mounting the shears so that the same may be tilted, an arm extending from said mounting means, and a disk adapted to operate one of the blades of said shears and provided with lugs thereon to engage said tilting arm to tilt the shears.

8. In a glass-forming machine, shears for severing the charges of glass, means for mounting said shears so the same may be tilted, means for suddenly tilting said shears to give the shearing end a sudden movement immediately after the shears have been tilted, and means for returning the shears after such tilting to their normal position.

9. In a glass-forming machine, shears for severing the charges of glass, means for mounting said shears so the same may be tilted, means for suddenly tilting said shears to give the shearing end a sudden movement immediately after the shears have been tilted, and a spring for suddenly returning the shears to their normal position after being tilted.

10. In a glass-forming machine, shears for severing the charges of glass formed of two blades, a spring for separating said blades, and a series of oppositely-acting movable cams to engage the shanks of said blades for closing the same.

11. In a glass-forming machine, shears for severing the charges of glass formed of two blades, a spring for separating said blades, and a rotary cam-disk mounted beside the shank of each blade, said disks having on their opposing faces a series of corresponding laterally-extending cam-surfaces adapted to engage the shanks of the blades and operate the shears.

12. In a glass-forming machine, shears for severing the charges of glass formed of two blades, a spring for separating said blades, and a series of oppositely-acting movable cams to engage the shanks of said blades for closing the blades, said cams having an inclined forward face and an abrupt rear face so that the opening movement of the shears will be sudden.

13. In a glass-forming machine, a shearing mechanism, a frame on which said shearing mechanism is mounted, and means for adjusting the position of said frame so as to give to the shearing mechanism any desired inclination.

14. In a glass-forming machine, a shearing mechanism including a frame, a carriage in said frame, means for reciprocating the carriage, shears on said carriage having a pair of blades, a spring for opening said shears, a shaft extending through said carriage, a pair of cam-disks mounted rigidly on said shaft with a series of corresponding cams extending laterally from each disk toward each other adapted to engage the shanks of the blades of the shears and operate the shears when said disks are rotated, a ratchet-wheel for driving said shaft and an actuating-pawl mounted on said frame with an extension from the ratchet-wheel engaging within the pawl that rides loosely upon said ratchet-wheel during the reciprocation of said carriage.

In witness whereof I have hereunto set my hand, at Muncie, Indiana, this the 12th day of February, 1904.

MARSHALL M. QUINN.

Witnesses:
 B. Frank Phillip,
 James C. Chamberlin.